Feb. 9, 1954 G. SZEKELY 2,668,699
MEANS FOR AERATING LIQUIDS
Filed Dec. 11, 1950
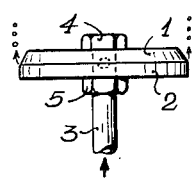
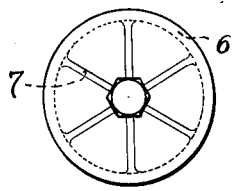
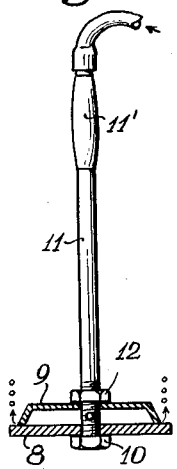
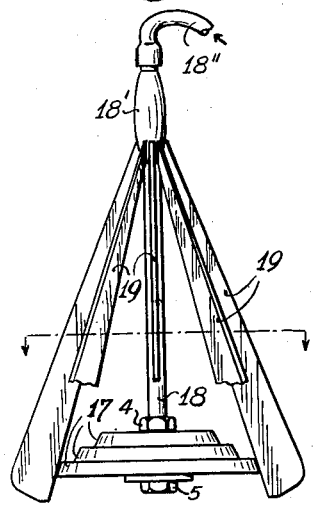
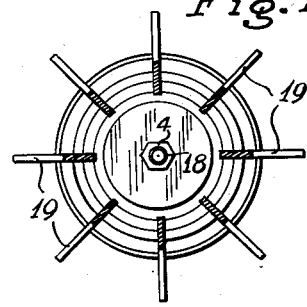
INVENTOR
GEORGE SZEKELY
BY Patented Feb. 9, 1954

2,668,699

UNITED STATES PATENT OFFICE 2,668,699

MEANS FOR AERATING LIQUIDS

George Szekely, Tel-Aviv, Israel

Application December 11, 1950, Serial No. 200,142

4 Claims. (Cl. 261—121)

The invention is concerned with a means for aerating liquids by incorporating into or passing through the latter air or gas which has to emanate from the liquids in small bubbles. This is hitherto as a rule done by using felt, rubber, leather, clay or the like porous or capillary material as an air diffusing means. All these materials have serious deficiencies, since their pores become easily covered or even clogged with sediments. This is not only unhygienic, but also obstructs in an increasing measure the passage of the air. If used for aerating or foaming of creams, drinks or the like comestibles, these substances unavoidably enter the pores or capillaries of said materials where they putrefy and choke the passage for the air. Mostly there are no effective means for getting the pores or capillaries clean again. The same applies to medicinal foaming or effervescent baths wherein the said pores become obstructed by soap, sand or other substances mixed with or carried by the water. To obviate the difficulties indicated aerating devices have been proposed which are composed of two or more discs provided on their contacting surfaces with grooves or flutes to which the air or gas is supplied through a common duct. But the air diffusers of this kind hitherto known are not satisfactory, since they are difficult to manufacture, give no small bubbles or pearls as desired, are not easily adjusted or tightened, and cannot be thoroughly cleaned. If the grooves or flutes are not precise or not precisely located upon each other or if one of the discs becomes distorted, then no bubbles emanate but whole beams of air or gas.

The invention is more particularly concerned with the air diffusers of the multidisc type and has for its object to improve the same in the hitherto objectionable respects.

The characteristic feature of the invention resides in passing the air or gas into the liquid between tightly contacting surfaces of solid bodies or discs, at least one of the contacting surfaces being rough or finely roughened. Preferably bodies such as glass or plastics having a high polished surface are used, and only their borders need be roughened. A hair-fine roughening is obtainable by a sand-papering or the like abrasive means. Air feeding channels lead from a common air duct to the roughened border. The discs are held together by screw nuts, by means of which also the pressure of the discs against each other and the size of the bubbles can be regulated. After loosening of the nuts, the discs can be more or less removed from each other and cleansed by a strong jet of air or water.

The invention is schematically illustrated in the annexed drawing by way of example in several embodiments. Fig. 1 is an elevational view of the new device to be used as a whipper; Fig. 1a is a cross section of the device on the dotted line shown in Fig. 1. Figs. 2 and 2a show an element adapted to be used with the device claimed in an elevational and plan view, respectively; and Fig. 3 represents partly in section a modified detail of the invention. Referring first to the main constructional details of the invention, Fig. 2 shows an aerating device composed of two contacting flat circular discs 1, 2. One of the contacting surfaces is roughened. Through the center of the discs is passed an air supplying tube 3, the wall of which is perforated at the level of the contact of said surfaces. The free end of the tube 3 is closed by a head 4 which abuts against disc 1. A nut 5 screwed on tube 3 urges disc 2 against disc 1. The edge or lateral face of disc 1 is sloping and encloses with disc 2 an angle which is smaller than 90° in order to facilitate the rise of the individual air bubbles without the liability of uniting with other bubbles.

Fig. 2a shows in a plan view the device according to Fig. 2 with the modification that only the border of the discs is roughened as indicated by the dotted circle 6. Air tube 3 communicates with the rough border through radiating grooves 7, machined in the contacting surfaces of the discs.

The air leaves the rough border in small pearls the size of which can be controlled by the nut 5. When this nut is loosened, the inner surfaces of the discs are easily accessible for cleaning purposes.

According to the embodiment of Fig. 3 a plane disc 8 is combined with an invertedly dished disc 9. Here too the two discs are held between a head 10 of an air supplying tube 11 and a nut 12 screwed on the tube. Here only the border or borders of the disc need be roughened. The air is introduced into the hollow space of the dished disc 9. The lateral surface of this disc is conical and sloping downward, so that the leaving single bubbles rise vertically without creeping along these surfaces and possibly combining thereby with other bubbles to such bigger bubbles as would be the case with a cylindrical lateral surface. Tube 11 is provided with a handle 11' and the device is most suitable for use in aerating of drinks.

Figs. 1, 1a represent a device destined to substitute the so-called "Whipper" for making foaming or effervescent creams. It comprises several superposed discs 17 of the described nature and a central air or gas pipe 18. Radiating wings or laths 19 form with the set of discs 17 a rigid structure and are adapted to guide the rising bubbles. Here too air tube 18 is provided with a handle 18' to which is attached an air hose 18".

From the foregoing it is clear that the new method lends itself for different uses and is perceptible of different embodiments. So for instance it may be highly useful for aerating and agitating the acid baths of galvanic electroplating batteries. If the contacting surfaces are highly polished and the discs are unyieldingly rigid, the discs may be held together by fastening or clamping means at one point or a central point only. But it would be within the scope of the invention, if the discs would be pressed into intimate contact between rigid plates or the like, on their whole extension or on the border of the discs only.

What I claim is:

1. A device for aerating or foaming of creams, drinks or the like comestibles, comprising a central tube attachable at one end to an air supplying hose, at least two discs detachably fastened near the other closed end of the tube, at least one disc of each two discs being roughened at the circumferential border by an irregular fine grain, means for pressing the discs at their borders against each other, radial air passages extending from the middle of the discs to their rough borders, openings in the tube debouching air into said air passages and radial wings attached to the central tube.

2. A device as claimed in claim 1, wherein at least one of the superposed discs has a circumferential face shaped as an inverted frustum of a cone the slope of which encloses with the vertical an angle smaller than 90°.

3. A device as claimed in claim 2, wherein the central tube is provided with a handle for manipulating the device.

4. A device as claimed in claim 1 wherein said air passages comprise grooves in the contacting faces of said discs.

GEORGE SZEKELY.

References Cited in the file of this patent

UNITED STATES PATENTS

| Number | Name | Date |
|---|---|---|
| 1,242,445 | Ittner | Oct. 9, 1917 |
| 1,973,713 | Justheim et al. | Sept. 18, 1934 |
| 2,074,597 | Stark | Mar. 23, 1937 |
| 2,235,218 | Koenig | Mar. 18, 1941 |

FOREIGN PATENTS

| Number | Country | Date |
|---|---|---|
| 693,612 | France | Sept. 1, 1930 |